Dec. 15, 1936.    P. HEMPEL    2,064,604
SPECTACLE FRAME
Filed Dec. 24, 1934

INVENTOR:
PAUL HEMPEL
his Attorney.

Patented Dec. 15, 1936

2,064,604

UNITED STATES PATENT OFFICE 2,064,604

SPECTACLE FRAME

Paul Hempel, Cologne, Germany

Application December 24, 1934, Serial No. 759,075
In France and Italy April 4, 1934

4 Claims. (Cl. 88—52)

This invention relates to spectacle frames, more particularly to spectacle frames provided with resiliently articulated parts.

In my prior application for Letters Patent Ser. No. 718,130 filed March 30, 1934 I have already described and claimed spectacle frames with templets non-resiliently hinged to the lenses, which templets consist of a rigid main portion and an end portion which can be moved in relation to said main portion and is resiliently pressed towards the back of the head of the wearer. Preferably these end portions are connected with the main portions of the templets by means of hinges enclosing a spring.

According to my present invention I modify and further improve such templets by providing them with end portions in such a manner, that the latter can be swung about an axis which is substantially identical with the longitudinal dimension of the main portion of the templet.

By this arrangement I am able to render the articulation more reliable, to reduce the space required for the joint, and to improve the outer appearance thereof.

Figure 1:
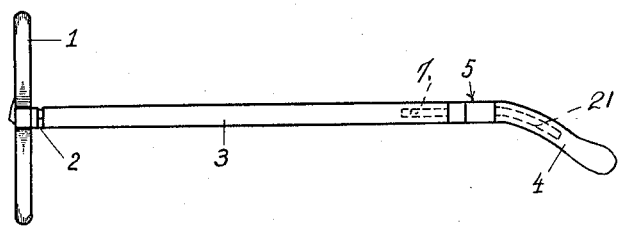
Figure 2:
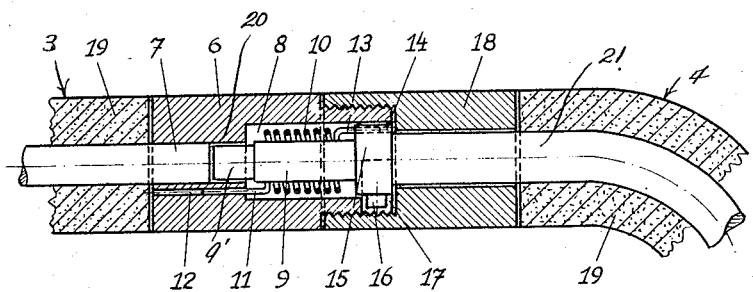

These and further objects, details and advantages of my present invention will become more apparent from the annexed drawing, which shows, by way of example only, In Fig. 1 a side view of a spectacle frame provided with the new templets, and in Fig. 2 a longitudinal cross section of the resilient end portion and of its connection to the main portion of the templet shown in Fig. 1.

In Fig. 1, 1 denotes the conventional centre or front portion of the spectacles carrying the lenses. The templets 3 are jointed to said centre portions by means of hinges 2, also in the conventional manner. In certain cases the centre portion 1 may be substantially omitted, the hinges 2 being directly secured to the lenses.

To the main portion 3 of each templet an end portion 4 is secured, the connection between these two parts consisting of a resilient joint 5. This resilient joint 5 comprises a sleeve 6 with a bore 20, part of which is enlarged to form a chamber 8. The sleeve 6 is secured to the main portion 3 by means of a pin 7, which is inserted in the main portion 3 and extends into the narrow bore 20.

A pin 21 inserted in the curved end portion 4 has a projection 9 disposed within the chamber 8 and embraced by a coil spring 10. The end 9' of the projection 9 extends into the narrow bore 20 of the sleeve 6. One end 11 of the torsion spring 10 is engaged in a hole 12 provided in the sleeve 6, while the other end 13 of this spring 10 is engaged in a hole 14 provided in the projection 9. In most cases I prefer to enlarge the portion of this projection 9, where the hole 14 is provided, to form a cylindrical body having the same diameter as the inside of the chamber 8. Secured to this cylindrical body is a pin 16. In the sleeve 6 I provide a recess or slot 17, which allows a certain range of movement to the abutment pin 16. If the sleeve 6 and the projection 9 are swung with relation to each other by an angle of about 90°, the pin 16 will abut against one of the edges of the recess 17, thus limiting the swing of the end portion of the templet in relation to its main portion. Behind the cylindrical portion 15 the projection 9 is embraced by a cap 18 connected or screwed to the sleeve 6 and holding and guiding the projection 9.

The sleeve 6 and the projection 9 may be made of a large variety of materials, although I find it safer to make them of metal. In many cases I find it advantageous to coat the projection 9, with celluloid or similar artificial masses so as to impart to it a diameter similar to that of the resilient joint. In such a case the diameter of the joint will be about the same as that of all the other parts of the templet.

In the drawing, 19 denotes a celluloid coating of this type.

While I have described a specific embodiment of my invention in the above description I wish it to be understood that this invention lends itself to various specific modifications without departing from its spirit and without sacrificing its advantages.

Having now particularly described and ascertained the nature of my invention and in what manner the same is to be performed, I declare that what I claim is:—

1. A templet for spectacles comprising a main portion, a rear end portion bent out of alignment with said main portion and adapted to be swung about an axis substantially identical with the longitudinal dimension of said main portion, a spring resiliently urging said rear end portion in a direction towards the back of the head of the wearer, and an abutment element limiting the swing of said rear end portion.

2. A templet for spectacles comprising a main portion, a separate rear end portion bent out of alignment with said main portion, a joint connecting said main portion to said rear end portion and permitting the latter to be swung about an axis substantially identical with the longitudinal dimension of said main portion, said joint comprising a sleeve, an axle engaged in said sleeve, a coil spring embracing said axle and urging said end portion in a direction towards the back of the head of the wearer, and an abutment element secured to said axle.

3. A templet for spectacles comprising a substantially horizontal main portion, a curved end portion, the longitudinal axes of the adjacent ends of said main portion and said curved end portion being in alignment with each other, and a torsion spring one end of which is connected with the main portion the other end being connected with the end portion to swing the latter about the substantially horizontal axis of the adjacent end of the main portion and press the end portion against the back of the head of the wearer.

4. A templet for spectacles comprising a substantially horizontal main portion, a curved end portion, a joint connecting said main portion with said end portion, the longitudinal axis of said joint being in alignment with the ends of the main portion and the curved end portion respectively, and a torsion spring disposed within said joint and adapted to swing the curved end portion about the substantially horizontal axis of said main portion and press the end portion against the back of the head of the wearer.

PAUL HEMPEL.